Aug. 29, 1967   E. D. OLIVER   3,338,824
WATER-WASHING RAFFINATE TO RECOVER THE SULFOLANE SOLVENT
Filed May 9, 1966
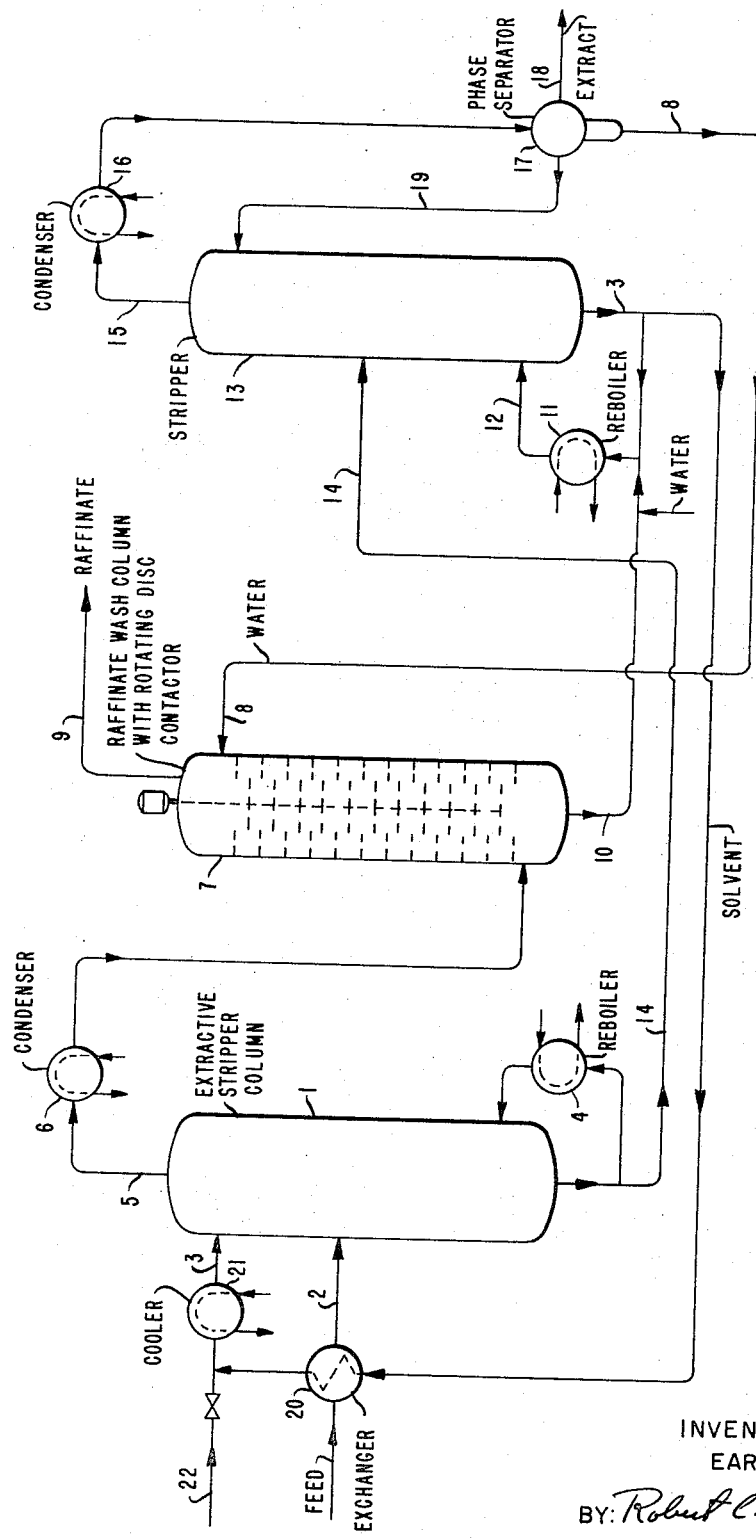
INVENTOR:
EARL D. OLIVER
BY: Robert C. Clement
HIS ATTORNEY 3,338,824
WATER-WASHING RAFFINATE TO RECOVER THE SULFOLANE SOLVENT
Earl D. Oliver, Arvada, Colo., assignor to Shell Oil Company, New York, N.Y., a corporation of Delaware
Filed May 9, 1966, Ser. No. 559,644
4 Claims. (Cl. 208—313)

This is a continuation-in-part of Ser. No. 454,242 filed April 26, 1965, which in turn is a continuation of application Ser. No. 103,125, filed April 14, 1961, both now abandoned.

This invention relates to a new and improved process for the recovery of aromatics from aromatic containing feed stocks by extractive stripping with a sulfolane solvent. More particularly this invention is directed to an improved extractive stripping process whereby highly selective solvents are employed and phase separation in the extractive stripping column is avoided to increase process selectivity.

A conventional process employed for the recovery of aromatics from various feed stocks is extractive distillation. In an extractive distillation process a highly soluble solvent is caused to flow down a distillation column as the distillation proceeds and as the vapors ascend from a reboiler. In such an extractive distillation process the solvent serves to scrub the vapors in the upper portion of the column selectively dissolving the more soluble component (i.e., aromatics). This increases the relative volatility of the less soluble component with respect to the more soluble component. The resulting fat solvent is partially stripped in the lower portion of the column by feed vapor ascending from the distillation reboiler. To reduce solvent loss overhead the raffinate is refluxed, that is a portion of the raffinate is condensed and recycled into the rectifying section of the column thereby increasing the concentration of saturates in that section of the column. Refluxing requires that the solvent employed in extractive distillation be highly soluble under all tray conditions in the column. For, if two liquid phases are formed, a poor separating efficiency results. Normally highly soluble solvents such as phenol are employed to ensure complete solvent miscibility under all column conditions. However, the selectivity of these highly soluble solvents is generally quite low. Therefore, conventional extractive distillation for the recovery of aromatics from various feed stocks has certain limitations and objectionable features such as:

(1) Small enhancement of relative volatility (low solvent selectivity) requiring large process heat loads.

(2) The removal of components boiling appreciably above the desired aromatics is necessary, e.g., by accurate, tedious and expensive prefractionation, to ensure a sharp separation in the extractive distillation step.

(3) Usually only aromatics of the same carbon number may be recovered in high purity during any one extractive distillation process.

The usage of selective solvents for aromatics such as sulfolane cannot be successfully adapted to extractive distillation because of the low solubility of sulfolane for non-aromatic hydrocarbons. One of the prerequisites for extractive distillation as noted supra is that the solvent be highly soluble under all tray conditions in the column. Due to the insolubility of sulfolane with non-aromatic hydrocarbons, sulfolane is entirely unsuitable for extractive distillation as phase separation of sulfolane and non-aromatics occurs in the rectification section of the extractive stripper.

Sulfolane type solvents have been utilized for the removal of aromatics in liquid-liquid extractive processes as shown in The Petroleum Refiner, volume 39, No. 9, Sept. 1960, page 244, but suffer the disadvantage of removing significant amounts of sulfolane in the non-aromatic raffinate which must be recovered by at least two steps. First the non-aromatics and sulfolane are allowed to phase separate in a settling zone and sulfolane withdrawn. The raffinate is then washed with water to remove any remaining sulfolane.

Since sulfolane is highly selective to aromatic hydrocarbons, but entirely unsuitable in an extractive distillation process, a novel method has been devised which is the basis of this application.

It has now been discovered that certain highly selective sulfolane solvents can be used in the extractive stripping process (of this invention) for the recovery of aromatic materials from hydrocarbon feed mixtures containing aromatics and non-aromatic hydrocarbons. The phase separation, which normally limits the use of these selective solvents in an extractive distillation process and the settling zone necessary in liquid-liquid extraction are avoided by the use of extractive stripping. The particular sulfolane solvents of the invention are uniquely suited for this particular type of extraction process because these solvents:

(1) Have relatively low volatilities and therefore are only slightly soluble in the non-aromatic vaporous raffinate;

(2) Can be readily separated from the raffinate overhead by water-washing and subsequently seasily stripped from the wash water;

(3) Are highly selective for aromatics thereby reducing process heat load caused by high solvent circulation rate;

(4) Have reduced heat capacity making it desirable to (a) operate the solvent stripped at high temperatures thereby reducing stripping stream requirements.

In the extractive stripping process of the invention, the conditions of temperature, pressure and concentration in the extractive stripper can be selected so that no phase separation occur. The solvent is introduced into the column at a point above the feed entry and caused to flow countercurrent to the ascending vapors. The solvent scrubs the vapors, selectively dissolving the more soluble components (aromatics). The fat solvent leaving the extractor is continuously stripped in a solvent stripper. The hydrocarbon portion of the fat solvent (aromatics) is taken overhead as a finished product and the lean solvent stream is recirculated to the extractive stripping column and reintroduced at a point above the feed entry. Steam is introduced into the solvent stripper, by means of a reboiler, to govern the recovery of the aromatic hydrocarbons in the overhead and the hydrocarbon content of the recycling lean solvent. Reflux is used to knock-back the sulfolane in the overhead stream of the solvent stripper. In that portion of the extractive stripping column below the feed entry, the non-armoatics are selectively distilled out of the extract phase by use of a reboiler. The vaporous non-aromatics containing some of the sulfolane solvent pass overhead from the extractive stripper as a raffinate phase. The raffinate is condensed and the sulfolane separated therefrom in a washing column, preferably a rotating disc contactor, with the water/solvent mixture being withdrawn from the bottom and separated, preferably by introduction, into the bottom of the solvent stripping zone.

Many different aromatic/non-aromatic mixtures may be separated by the extractive stripping process of the present invention; however, a preferred embodiment of the invention is the recovery of aromatics from hydrocarbon feed mixtures containing from about 20% v. to about 90% v. aromatics. The feed mixtures are at least partially vaporizable at temperatures substantially below the boiling temperature of the various sulfolane solvents and are inert towards these solvents. Moreover, the presence of the sulfolane solvent in the mixture causes a greater change in the "escaping tendency" of one component relative to that of the other component. By "escaping tendency" is meant the potential of one component to pass from the liquid to the vapor phase. Some specific examples of aromatics which may be recovered in accordance with the present invention are benzene, toluene and xylene, e.g., from catalytic reformates. A preferred embodiment of the invention is the extractive stripping of platformates to produce an aromatic high octane extractive for premium grade motor gasoline blending and non-aromatic low octane turbine feed platformate. Generally the different types of mixtures of compounds which can be separated by the extractive stripping process of this invention cannot be separated by ordinary fractional distillation alone, for as a rule, these various components have overlapping boiling ranges.

The apparatus employed in this process may be any conventional or convenient type known to those skilled in the art. For simplicity the drawing does not show all the pumps, tanks, heat exchangers, valves, bypasses, vents, reboilers, condensers, coolers, and other auxiliaries that may be necessary for the proper operation of the process, but the inclusion of which will be evident to those skilled in the art.

The temperature for extractive stripping with the sulfolane solvents of the invention may range within wide limits provided it is above the bubble temperature of the mixture and substantially below the boiling temperature of the solvents under the pressure and temperature conditions maintained in the extractive column. Subatmospheric pressures may be resorted to in order to reduce the temperature if the mixture is not thermally stable at high temperature. Suitable temperatures for the process range from about the melting point of the solvent up to about the boiling point at pressures from 0.1 p.s.i. absolute to about 500 p.s.i. absolute, assuming the particular sulfolane solvent is stable under these conditions. The most suitable operating temperature varies with the pressure maintained during the operation and is generally a compromise since in general the selectivity of these solvents seems to decrease with an increase in temperature, while simultaneously there is an increase in the absolute solubility as the temperature is increased, so that at the boiling temperature of the solvent at the existing pressure substantially no hydrocarbon will dissolve no matter how high the selectivity might become. In a preferred embodiment of the invention, substantially atmospheric pressures are maintained in the extractive stripping column.

The amount of the solvent should be at least sufficient to dissolve the constituent to be extracted. In some cases a considerable excess over this amount may be used especially when it is desired to scrub the last traces of the more soluble constituents from the vapor. The most economical amount varies with the nature of the particular sulfolane solvent involved, the temperatures and pressures employed and the particular feed mixture to be extractively distilled. This amount can be determined experimentally. Useful solvent to feed ratios in the extractive stripping column may range from about 0.5/1 to about 20/1 by volume, and preferably not more than about 5/1 by volume. The solvent selectivity of the sulfolane solvents can be further enhanced by the addition of water to the solvent. Depending on the nature of the feed to be extractively stripped, water in concentrations as high as 10% v. in the solvent can be employed.

The sulfolane solvents which can be used according to this invention should preferably be selective to aromatics. Further, the solvent must be stable at the extraction temperatures maintained in the extractive stripping column and at the stripping temperatures maintained in the solvent stripping column. That is, the solvent must be sufficiently heat stable so that it may at least partially vaporize without decomposition in the presence of the components of the mixture. In a preferred embodiment the sulfolane solvent has a boiling temperature higher than that of the aromatic components of the mixture to be extractively stripped.

The sulfolane solvents of the invention may be made by condensing a conjugated diolefin with sulfur dioxide and then subjecting the resulting product to hydrogenation, alkylation, hydration and/or other substitution or addition reactions. A 2-sulfolene may be made similarly by isomerizing instead of by hydrogenating the product resulting from condensing a conjugated diolefin with sulfur dioxide. Unsubstituted sulfolane, the preferred sulfolane solvent in the process of the invention, has the formula:

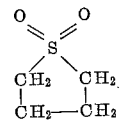

and 2-sulfolene has the formula

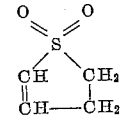

Other solvents which have high selectivity for separating aromatics from nonaromatic hydrocarbons are: 2-methylsulfolane, 2,4 - dimethylsulfolane, 2,4-dimethyl-4-sulfolane, methyl 3-sulfolanyl ether, ethyl-3-sulfolanyl sulfide, methyl-aryl-3-sulfolanyl ether, n-aryl-3-sulfolanyl amine, 3-sulfolanyl acetate and others. Although the use of sulfolane solvents is a preferred embodiment of the invention other suitable solvents such as diethylene glycol, various polyethylene glycols and mixtures thereof can be employed.

In a preferred embodiment of the invention the sulfolane solvents for use in the extractive stripping process have the general formula:

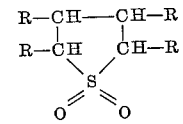

Where R can be a hydrogen atom, an alkyl group having up to 8 carbon atoms, an aryl radical having up to 10 carbon atoms, an alkoxy radical having up to 8 carbon atoms, an arylalkyl radical up to 12 carbon atoms or mixtures thereof. In a particularly preferred embodiment, all R's are hydrogen.

Referring to the drawing, the feed mixture to be separated is introduced into column 1 as a liquid through line 2, the feed countercurrently contacts a solution of a sulfolane solvent introduced through line 3 at a temperature slightly below the bubble temperature of said feed mixture. The solvent is preferably introduced at the topmost tray of the column. Extractive stripping column 1 contains several trays such as valve trays, grid trays and the like to improve vapor/liquid contacting. In addition to reboiler 4, column 1 is equipped with vapor line 5 and extract line 14.

Vapor passes through line 5 into condenser 6 and enters raffinate wash column 7 near the bottom. Raffinate wash column 7 can be a packed column, tray column, rotating disc contactor or any other suitable type of contactor. Water is introduced into wash column 7 through line 18 and the solvent-free raffinate product is passed overhead through line 9. The water-sulfolane mixture passes out of the wash column through line 10 into reboiler 11 and finally into solvent stripper column 13 through line 12.

The extract phase (i.e., fat solvent) comprising the sulfolane solvent and the selectively absorbed component of the feed mixture (aromatics) is withdrawn from the column 1 through bottom line 14. A portion of the withdrawn extract phase is recycled to the column through reboiler 4. The remaining fat solvent is continuously stripped in solvent stripper 13. The aromatic portion of the fat solvent is taken overhead through line 15 into condenser 16. The condensed mixture of water and product then passes into phase separator 17 with the aromatic finished product withdrawn through line 18. The water is withdrawn through line 8 and can be advantageously introduced into raffinate wash column 7. A portion of the aromatic product is recycled to the solvent stripper through line 19 as reflux to knock-back the sulfolane in the overhead stream of the solvent stripper. The lean solvent passes out of stripper column 13 through line 3 and is reintroduced into extractive distillation column 1 at a point above the feed entry after passing through heat exchanger 20 and cooler 21. The lean solvent can contain up to 10% v. water, with the exact concentration desired being maintained by controlling stripper column conditions. Valved line 22 is provided for the addition of fresh solvent to the system as required. A slip stream of approximately 5 to 10% v. of the total solvent inventory can be passed to a solvent clean-up system, not shown, including a flasher or vacuum column, during each 24-hour period of separation to remove contaminants. After solvent clean-up, the solvent can be returned to the system through line 3.

From the foregoing, it is evident that the process of the present invention differs from extractive distillation in at least two respects. Firstly, sulfolane, which is insoluble in non-aromatic hydrocarbons, cannot be used in an extractive distillation process, and, secondly, extractive distillation, even with a solvent soluble under all tray conditions, requires a reflux step to remove solvent from the raffinate. The process claimed herein utilizes the benefits obtainable from the use of highly selective solvents while at the same time not requiring the solvent removal steps such as raffinate refluxing in extractive distillation and a raffinate settling zone in liquid-liquid extraction.

I claim as my invention:
1. An extractive stripping process wherein a sulfolane solvent is employed to separate a feed mixture of aromatic and non-aromatic hydrocarbons, comprising:
   (1) introducing a sulfolane solvent into an extractive stripping column at a point above the feed entry;
   (2) countercurrently contacting the vapor from said feed mixture with said solvent, thereby selectively absorbing the aromatic components of said vapor;
   (3) withdrawing from the bottom of said stripping column an extract phase;
   (4) introducing said extract phase into a solvent stripper column to separate solvent therefrom as makeup solvent to said extractive stripping column, while recovering said aromatic components overhead;
   (5) withdrawing overhead from said extractive stripping column a vaporous raffinate phase containing the non-aromatic hydrocarbons and a minor portion of said solvent;
   (6) condensing said raffinate phase;
   (7) separating the non-aromatic components from all of said condensed raffinate phase only by dissolving said minor solvent portion into a water phase;
   (8) recovering said solvent by introducing said water phase into the bottom of a solvent stripper column; and
   (9) returning said solvent as makeup solvent to said extractive stripping column.

2. A process in accordance with claim 1 wherein the sulfolane solvent has the structural formula

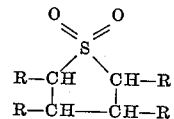

wherein R is selected from the group consisting of hydrogen atoms, an alkyl radical having up to 8 carbon atoms, an aryl radical having up to 10 carbon atoms, an alkoxy radical having up to 8 carbon atoms, and an arylalkyl radical having up to 12 carbon atoms.

3. A process in accordance with claim 1 wherein the sulfolane solvent contains up to 10% v. water.

4. A process in accordance with claim 2 wherein the sulfolane solvent is sulfolane.

References Cited

Petroleum Refiner, vol. 39, No. 9, September 1960, p. 244.

Weissberger: "Technique of Organic Chemistry," vol. IV (Distillation, 1951, p. 338, Interscience Publishers, Inc., N.Y.).

DELBERT E. GANTZ, *Primary Examiner.*

H. LEVINE, *Assistant Examiner.*